United States Patent [19]

Tabata et al.

[11] Patent Number: 5,430,518
[45] Date of Patent: Jul. 4, 1995

[54] REMOTE CONTROL CAMERA

[75] Inventors: Yasushi Tabata; Norio Numako; Takuma Sato, all of Tokyo, Japan

[73] Assignee: Asahi Kogaku Kogyo Kabushiki Kaisha, Tokyo, Japan

[21] Appl. No.: 957,808

[22] Filed: Oct. 8, 1992

[30] Foreign Application Priority Data

| Oct. 9, 1991 | [JP] | Japan | 3-290526 |
| Oct. 9, 1991 | [JP] | Japan | 3-290527 |
| Oct. 16, 1991 | [JP] | Japan | 3-296347 |
| Oct. 16, 1991 | [JP] | Japan | 3-296348 |

[51] Int. Cl.$^6$ .................................... G03B 17/38
[52] U.S. Cl. .................. 354/267.1; 354/237; 354/238.1; 354/240; 354/258.1
[58] Field of Search ............ 354/237, 238.1, 240, 354/256, 258.1, 267.1

[56] References Cited

U.S. PATENT DOCUMENTS

| 3,922,691 | 11/1975 | Matsumoto . | |
| 3,961,342 | 6/1976 | Maida . | |
| 4,743,930 | 5/1988 | Satoh . | |
| 4,937,604 | 6/1990 | Yoshida et al. | 354/267.1 |
| 4,998,125 | 3/1991 | Watanabe et al. . | |
| 5,014,080 | 5/1991 | Miyadera . | |
| 5,093,679 | 3/1992 | Taniguchi et al. . | |
| 5,122,824 | 6/1992 | Hayashi | 354/267.1 |
| 5,229,809 | 7/1993 | Wakaayashi et al. | 354/267.1 |

FOREIGN PATENT DOCUMENTS

| 0431372 | 6/1991 | European Pat. Off. . |
| 1131539 | 5/1989 | Japan . |
| 2244038 | 9/1990 | Japan . |

OTHER PUBLICATIONS

Patent Abstracts of Japan, vol. 14, No. 565 (P-1143), Dec. 17, 1990.
Patent Abstracts of Japan, vol. 13, No. 377 (P-922), Aug. 2, 1989.
French Search Report and Annex.
United Kingdom Search Reports.

Primary Examiner—Monroe H. Hayes
Attorney, Agent, or Firm—Sandler, Greenblum & Bernstein

[57] ABSTRACT

A remote control camera has a remote controller that emits a remote control signal. A remote control signal receiving device is provided in a camera body to receive the remote control signal emitted from the remote controller. The camera also includes a delaying release circuit which commences an exposure operation after a predetermined delay time, and a control circuit which actuates the delaying release circuit when the remote control signal receiving device receives the remote control signal emitted from the remote controller.

3 Claims, 14 Drawing Sheets

REMOTE CONTROL CAMERA

BACKGROUND OF THE INVENTION

1. Field of the Invention

The present invention relates to a remote control camera having a remote control unit.

2. Description of Related Art

A remote control camera having a remote control unit which can remotely control a release mechanism of the camera is known. The operation which can be remotely controlled by the remote control unit in a known remote control camera is, however, only the shutter release operation.

Furthermore, in recent motor driven cameras in which the measurement of a brightness of an object to be taken, calculation of exposure values, control of a diaphragm, measurement of object distance, focus control, film winding, driving operation of a zoom lens, etc., are carried out by electronic circuits or an electric motor, to which electric power is supplied by a battery incorporated in the camera, it is necessary to minimize power consumption of the battery, since the camera does not work in the absence of the battery power. In particular, in a remote control camera having a remote control unit, as mentioned above, to make it possible for a photographer to remotely actuate the camera (shutter release), the power supply is always maintained ON during the remote control operation, resulting in a waste of battery power. Furthermore, when a photographer takes several pictures by remote control within a relatively short space of time, he or she does not usually turn OFF the power switch of the camera for each shot. This further accelerates the battery power consumption.

Furthermore, in a known camera having a built-in strobe, it is necessary to precharge a capacitor included in a strobe light emitting circuit in order to effectively emit strobe light. Even after the charging is completed, it is desirable to recharge the capacitor immediately before a picture is taken, due to the inevitable natural discharge which will occur to some extent.

It is necessary to carry out the strobe charging operation only when it is needed to avoid a waste of battery power. To this end, in a known electronic control camera, the capacitor is charged only when a predetermined requirement is satisfied.

The inventors of the present invention have, however, found that if such a strobe charging control system, as mentioned above, is directly applied to a remote control camera having a remote control unit, the strobe sometimes fails to emit strobe light when necessary.

SUMMARY OF THE INVENTION

The main object of the present invention is to eliminate the drawbacks mentioned above by providing a camera having an improved remote control unit which can remotely control various functions.

Another object of the present invention is to provide an improved remote control camera which can effectively avoid a waste of battery power.

Still another object of the present invention is to provide a remote control camera having a built-in strobe and a remote control unit in which strobe light is emitted, if necessary, without failure.

According to an aspect of the present invention, there is provided a remote control camera having a camera body and a remote controller that emits a remote control signal. The camera body is provided with a remote control signal receiving mechanism for receiving the remote control signal emitted from the remote controller to output a corresponding operation signal. The remote control camera comprises a delaying release mechanism for commencing an exposure operation after a predetermined time of delay, and a control mechanism for actuating the delaying release mechanism when the remote control signal receiving mechanism receives the remote control signal emitted from the remote controller.

Preferably, the delaying release mechanism comprises a self-timer mechanism which carries out the releasing operation at different delay times when the release switch of the camera body is actuated and when the remote control signal receiving mechanism receives the remote control signal emitted from the remote controller.

According to another aspect of the present invention, there is provided a remote control camera having a camera body with a shutter and a remote controller which is detachably mounted to the camera body to emit a remote control signal. The camera body is provided with a remote control signal receiving mechanism for receiving the remote control signal emitted from the remote controller to output a corresponding operation signal. The remote control camera comprises an exposure control mechanism for alternatively selecting a normal shutter drive mode and a bulb mode in which the shutter is maintained open under a predetermined condition, and a shutter control mechanism for controlling the shutter in response to the remote control signal emitted from the remote controller when the bulb mode is selected.

Preferably, the remote controller comprises a release button which is actuated to output a release signal to open the shutter, so that the shutter is maintained open while the release button is actuated.

According to still another aspect of the present invention, there is provided a remote control camera having a camera body with separate motor driven elements, and a remote controller which is detachably mounted to the camera body to emit a remote control signal. The camera body is provided with a remote control signal receiving mechanism for receiving the remote control signal emitted from the remote controller, a movable lens barrel which is movable between a retracted position and a picture taking position, and a drive mechanism for driving the movable lens barrel between the retracted position and the picture taking position. The remote control camera comprises a power source circuit which supplies electrical power to the remote control signal receiving mechanism and the drive mechanism, and a control mechanism for controlling the drive mechanism, which moves the movable lens barrel to the retracted position, and which cuts the power supply to at least a part of the motor driven elements, other than the remote control signal receiving mechanism.

The control mechanism cuts the power supply to the remote control signal receiving mechanism when a second predetermined time lapses after the cutting of the power supply to at least a part of the motor driven elements, without effecting any operation.

According to still another aspect of the present invention, there is provided a remote control camera having a camera body with separate motor driven elements and a remote controller which is detachably mounted to the camera body to emit a remote control signal. The camera body is provided with a remote control signal receiving mechanism for receiving the remote control signal emitted from the remote controller, and a strobe charging circuit. The remote control camera comprises a remote controller detecting mechanism for detecting the attachment of the remote controller to the camera body, and a charge control circuit for actuating the strobe charging circuit when the remote controller detecting mechanism detects that no remote controller is attached to the camera body.

Preferably, the provision is made of a judging mechanism for determining whether the strobe charge is necessary in accordance with predetermined requirements to actuate the strobe charging circuit when the strobe charge is determined to be necessary.

The present disclosure relates to subject matter contained in Japanese patent application Nos. HEI3-290526 and 03-290527 (both filed on Oct. 9, 1991), and Japanese patent application Nos. HEI3-296347 and HEI3-296348 (both filed on Oct. 16, 1991) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
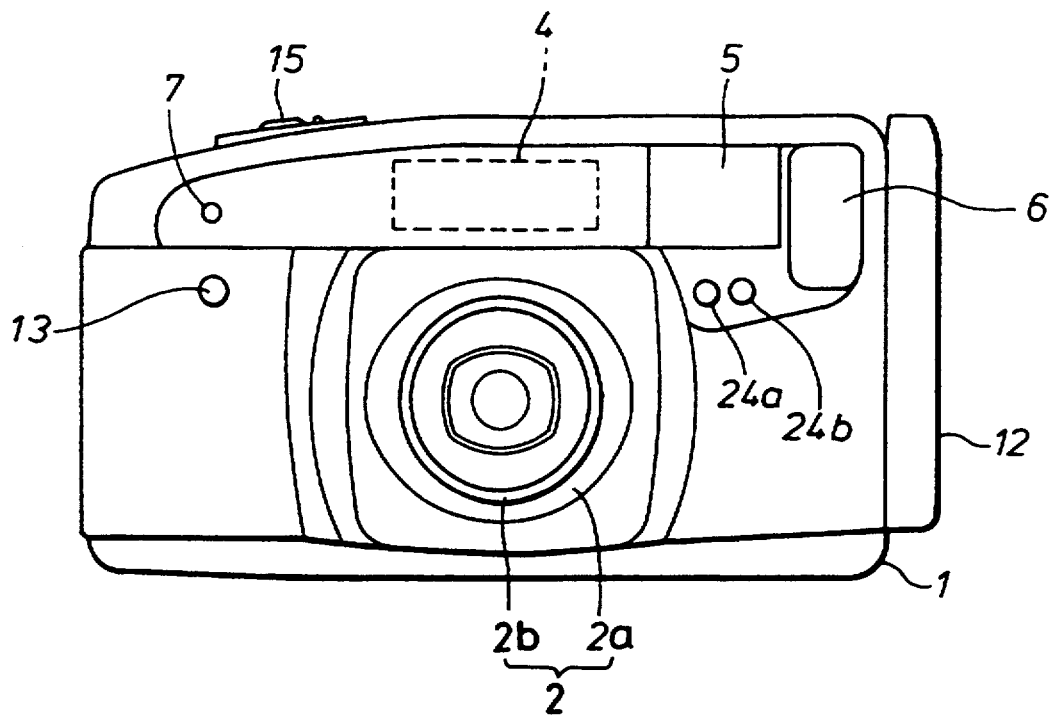
FIG. 1 is a front elevational view of a remote control camera having a remote control unit according to the present invention.
Figure 2:
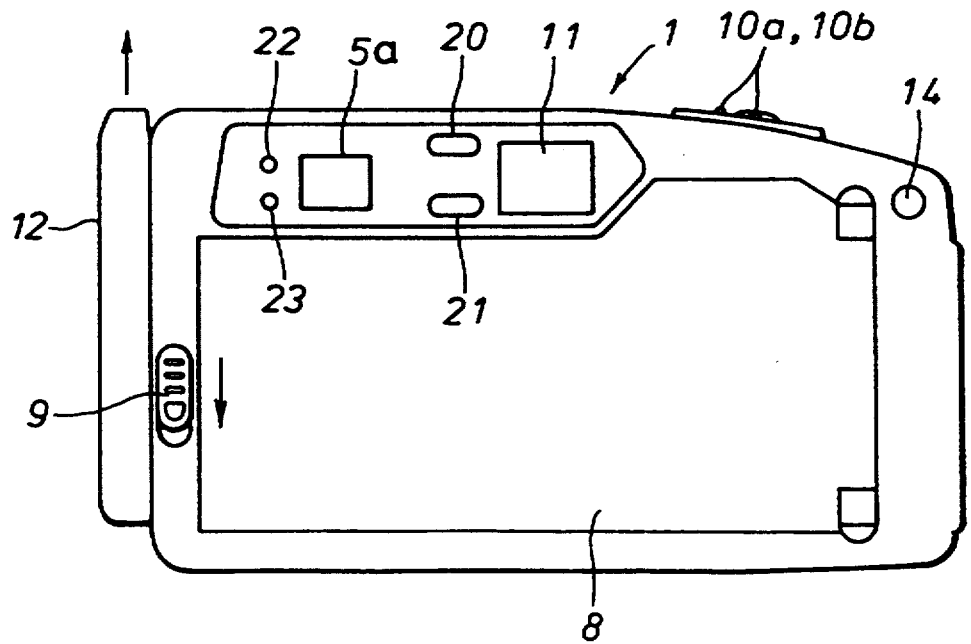
FIG. 2 is a back view of a remote control camera shown in FIG. 1.
Figure 3:
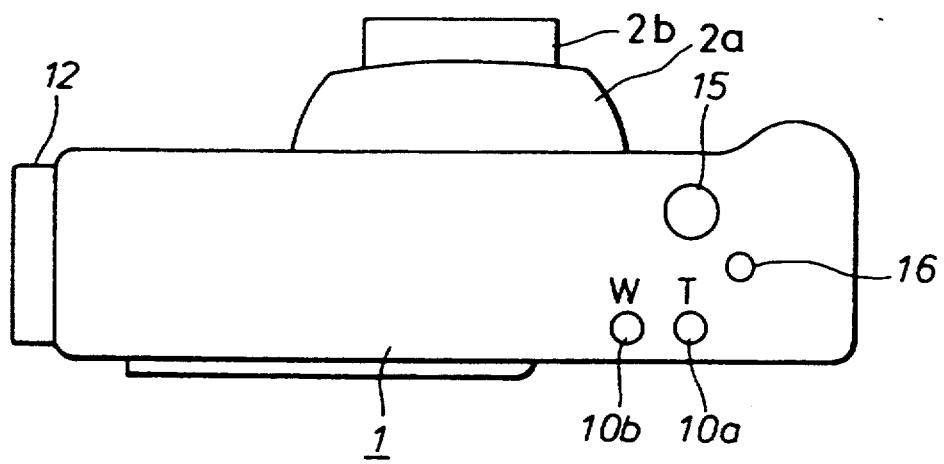
FIG. 3 is a plan view of a remote control camera shown in FIG. 1.

FIGS. 1 through 3 show an embodiment of a remote control camera according to the present invention.

A remote control camera has a camera body 1 and a remote control unit 12 which is detachably attached to the camera body 1. The camera body 1 includes a powered zoom lens 2 having a stationary zoom lens barrel 2a and a movable zoom lens barrel 2b, an object distance measuring device 4, a view finder 5, and a strobe 6, similar to a conventional camera. The camera body 1 is provided on an upper end of a front face thereof, with a red self-timer lamp 7 which flickers at a relatively long time interval when the remote control unit 12 is detached from the camera body 1 and continuously flickers or is lighted in some manner for a relatively short time interval in accordance with operational states when a self timer function operates.

As can be seen in FIG. 2, a back cover 8 of the camera can be opened by a back cover opening lever 9. The movable lens barrel 2b is continuously moved between a telephoto position and a wide-angle position by a telephoto button 10a and a wide-angle button 10b provided on the top of the camera body 1. Various states or functions of the camera are indicated in an LCD (liquid crystal display) window 11. The camera body 1 is provided, on the front and rear faces thereof, with remote control light receiving windows 13 and 14 which receive infrared light emitted from the remote control unit 12, respectively. Numerals 15 and 16 designate a shutter button and a power button, provided on the top of the camera body 1, respectively.

Camera body 1 is provided on the back thereof with a mode selection button 20 which selects exposure modes of the camera, a drive button 21 which selects drive modes of the camera, a green lamp 22 which indicates the focus state of an autofocus function, and a red lamp 23 which flickers during the strobe charging and lights when strobe light is emitted. These elements 20, 21, 22 and 23 are provided in the vicinity of an eyepiece portion 5a of a view finder to surround the same. A pair of photometering windows 24a and 24b are provided below the view finder 5 on the front surface of the camera body 1.

Figure 4:
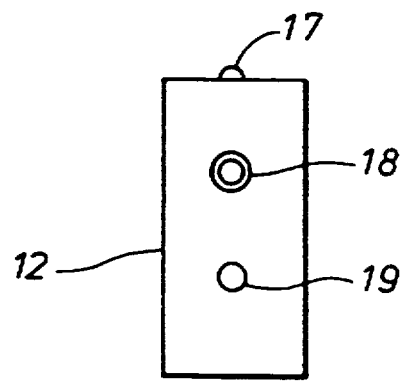
FIG. 4 is a front elevational view of a remote control unit of a remote control camera shown in FIG. 1.

As shown in FIG. 4, the remote control unit 12 is provided with an infrared light emitter 17, a remote control shutter button 18 corresponding to the shutter button of the camera, and a remote control zoom button 19 for actuating the powered zoom lens 2. The infrared light emitter 17 emits remote control signals when the remote control shutter button 18 or the remote control zoom button 19 is turned ON.

Figure 5:
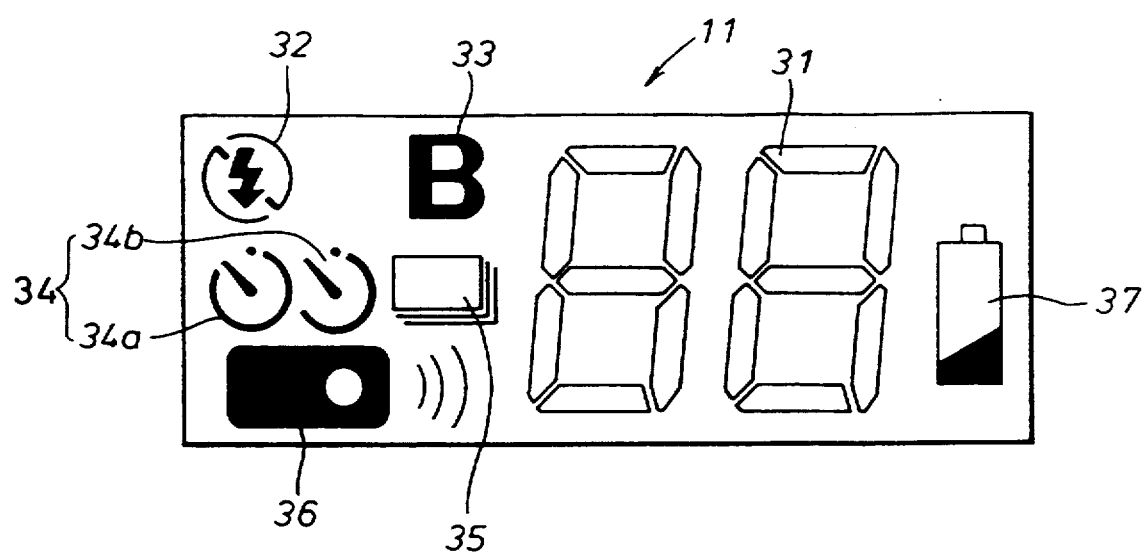
FIG. 5 is a front elevational view of an LCD window of a remote control camera shown in FIG. 1.

FIG. 5 shows an indication of the LCD window 11 which contains a first (center) indication portion 31 which indicates the counted number of taken or remaining frames of a film, a second indication portion 32 which indicates the state of the strobe, a third indication portion 33 which indicates the bulb function, a fourth indication portion 34 having a left portion 34a which indicates a regular self timer function and a right portion 34b which indicates a double self timer function in which a first picture is taken after the lapse of a predetermined period of time before a second picture is automatically taken 2~5 seconds later, a fifth indication portion 35 which indicates a continuous photographing mode in which pictures can be continuously taken when the shutter button 15 is depressed, a sixth indication portion 36 which indicates that the remote control signal can be received when the remote control unit 12 is detached from the camera body 1, and a seventh indication portion 37 which indicates the state of the battery, respectively. The indication portions 32 through 36 are provided on the left side of the center (first) indication portion 31. Only the seventh indication portion 37 is provided on the right side of the first indication portion 31.

Figure 6:
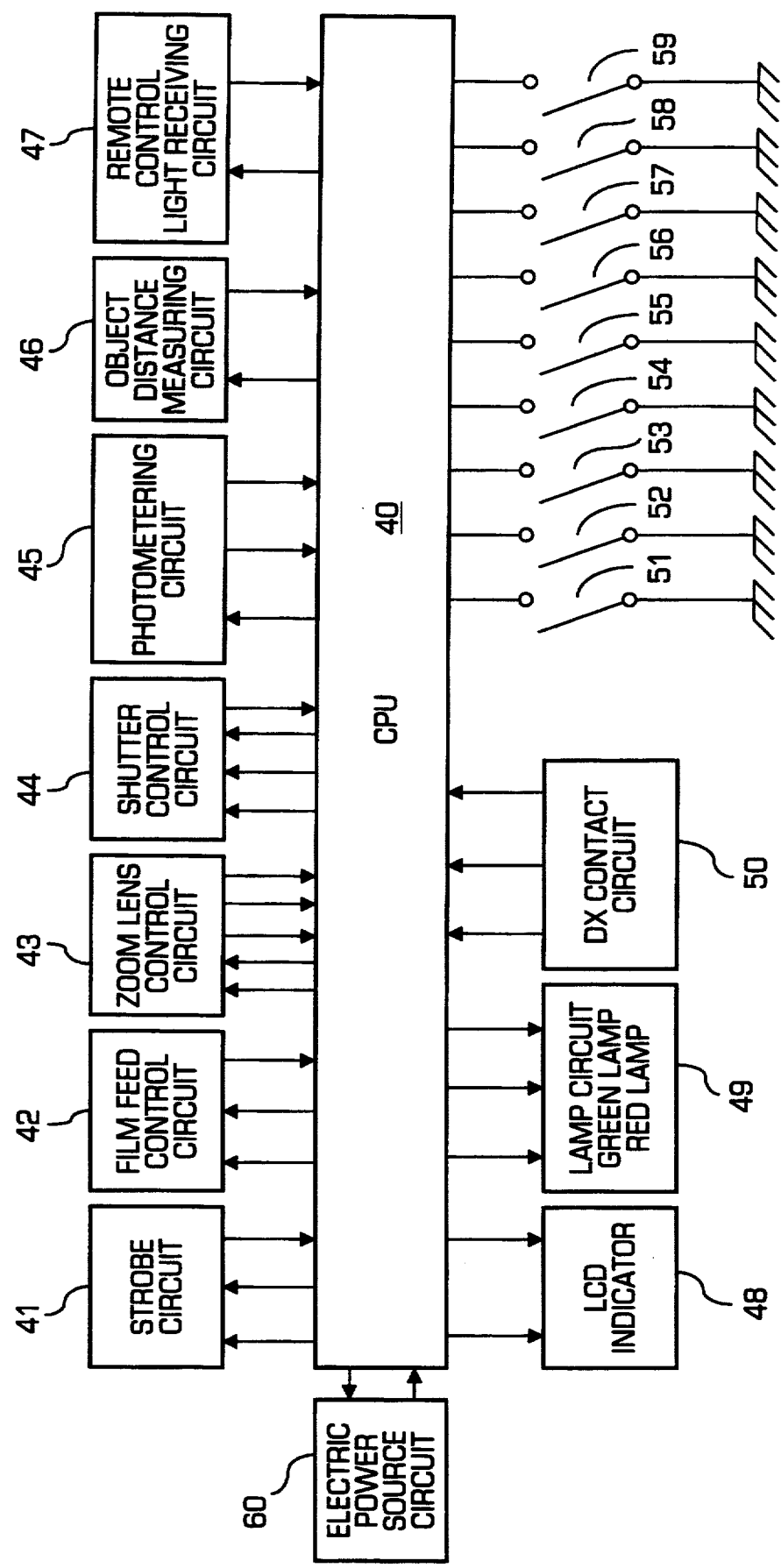
FIG. 6 is a block diagram of a control circuit of a remote control camera according to the present invention.

FIG. 6 shows a simplified block diagram of a control circuit of the camera. To a CPU 40 are connected a strobe circuit 41, a film feed control circuit 42, a zoom lens control circuit 43, a shutter control circuit 44, a photometering circuit 45, an object distance measuring circuit 46, a remote control signal receiving circuit 47, an LCD portion 48, a lamp circuit 49, and a DX contact circuit 50. The CPU 40 is also connected to a main switch 51 associated with the power button 16, a back cover switch 52, a photometering switch 53, a release switch 54, a telephoto switch 55, a wide-angle switch 56, a mode switch 57, a drive switch 58, and a remote control switch 59. The switches other than the back cover switch 52, which is turned ON when the back cover 8 is closed, and the remote control switch 59, which is turned ON when the remote control unit 12 is detached from the camera body 1, are all momentary switches. The photometering switch 53 is turned ON when the shutter button 15 is depressed half-way, and the release switch 54 is turned ON when the shutter button 15 is fully depressed.

Electric power is supplied to the CPU 40 from a power source circuit 60 which includes a battery, a constant voltage circuit and a clock signal generator, etc., as is well known.

CPU 40 generally controls all of the functions of the camera, such as control of the strobe device 41, etc., and further serves as a regulator and a switching circuit for controlling the power supply to the strobe device 41 and the remote control signal receiving circuit 47, etc., from the power source circuit 60. Namely, the CPU 40 supplies the respective elements with power when the power supply has not been effected (i.e., a power supply OFF state) and cuts the power supply to the elements when the power supply has been effected (i.e., a power supply ON state), every time the main switch 51 is actuated (i.e., turned ON).

If a switch is not actuated within a first predetermined period of time (e.g., three minutes) during the ON state of the power source, the movable zoom lens barrel 2b is retracted into in the stationary zoom lens barrel 2a by the zoom lens control circuit 43 to protect the movable zoom lens barrel 2b, and the power source is turned OFF.

When the remote control unit 12 is detached from the camera body 1, power is supplied to the remote control signal receiving circuit 47, and the camera is changed to a stand-by state, in which a picture can be taken by the remote control.

If an operation is not performed within a second predetermined time (e.g., 30 minutes), in the stand-by position, the CPU 40 clears the held data (mode data, etc.) and is transferred to the power OFF state, in which no power is supplied to the remote control signal receiving circuit 47.

The following discussion will be directed to the operation of a remote control camera as constructed above (see FIGS. 7 through 13).

To reduce power consumption, the CPU 40 is usually maintained in a stand-by position, in which no operation is effected (no clock signal is issued). The CPU 40 performs the main operation shown in FIGS. 7 through 13 when a predetermined start condition (requirement), depending on the state of the camera, is satisfied.

In the main operation, it is determined whether the film is loaded in the camera at step S101. If a film loading is not completed, whether the back cover 8 is closed (i.e., whether the back cover switch 52 is turned ON) is checked at step S102. If the back cover 8 is closed, a loading operation (i.e., cueing) is carried out at step S103. In the loading operation, whether the film is appropriately fed is checked in accordance with a film movement signal. If the film is appropriately advanced, the loading operation has been completed. Thereafter, it is checked whether the power source is in the ON state, to enable a picture to be taken, at step S104.

If the loading operation is completed at step S101, whether the back cover 8 is closed is checked at step S105. If the back cover 8 is open, the number of the film (counter) is initialized at step S106 and control proceeds to step S104. If the back cover 8 is closed at step S105, or if the back cover 8 is open at step S102, control proceeds to step S107 to check whether the main switch 51 (power button 16) is turned ON. If the main switch 51 is depressed at step S107 and if the power source has already been turned ON (step S108), the power source is switched OFF at step S109. If the power source is not turned ON, it is checked whether 30 minutes have elapsed after the power source is automatically turned OFF (steps S108, S110). If 30 minutes have elapsed, the camera is in an OFF state, in which it is responsive only to the back cover 8 or the power button 16. Thereafter, the power source is turned ON (step S111). If 30 minutes have not yet elapsed, the power source is automatically turned ON at step S112. After the operation at step S111 or S112 is completed, the strobe charge demand flag is set and control proceeds to step S131 (step S113).

In the illustrated embodiment, if no operation is effected within 3 minutes, the movable zoom lens barrel 2b is automatically retracted in the stationary lens barrel 2a to protect the movable lens barrel 2b. The focal length and focal mode of the powered zoom lens 2, and the set position of the driving operation are memorized. When the power button 16 is depressed within 30 minutes after the automatic retraction of the movable lens barrel, the camera is returned to an initial position before the automatic retraction.

If main switch 51 is not actuated (not ON) at step S107, control proceeds to step S114. If the power source is in the ON state, control proceeds to steps S123 and S125 to check whether the mode switch 57 and the drive switch 58 are switched ON, respectively. If the mode switch 57 is switched ON, the mode setting operation, to switch the set position of the strobe, and a bulb function is performed (step S124). If the drive switch 58 is turned ON, the drive setting operation is performed to switch the self-timer, double self-timer and continuous taking function (step S126).

If the power source is not turned ON within 30 minutes after the power source has been automatically switched OFF at step S114, control proceeds to steps S115 and S116 to check whether the set time of the the 30-minute timer is up, and whether or not the remote control unit 12 is attached to the camera body. If the set time of the the 30-minute timer is up and the remote control unit is attached to the camera body 1, control proceeds to step S119 to turn OFF the power source of the light receiving circuit 47. Thereafter, the memory which stores the mode, drive, focal length data, etc., is cleared (step S120). Thereafter, whether the main switch 51 is turned OFF is checked (step S121). If the main switch 51 is turned OFF, control proceeds to step S122, in which the camera can be actuated only when the back cover switch 52 is changed and the main switch 51 is closed.

Note that if the power source is OFF at step S104, or the power source is turned OFF at step S109, the operations at steps S119 through S122 are performed.

If the set time of the 30-minute timer has not expired, and the remote control unit 12 is detached from the camera at steps S115 and S116, respectively, the remote control signal confirming operation is effected (step S117). Thereafter, whether the remote control zoom switch 19 is actuated is checked at step S118. If no remote control zoom signal is received at step S118, control proceeds to step S149, in which the operation can be performed only when the back cover switch 52 is switched, the main switch 51 is closed, the remote control switch 51 is switched, the set time of the 30-minute timer is up, or the remote control signal is input. If the remote control zoom signal is received at step S118, control proceeds to step S112, at which step the power source is automatically turned ON.

If both the mode switch 57 and the drive switch 58 are not actuated at steps S123 and S125, the taking operation is effected (step S130), as long as there is no loading error (step S127), the film rewinding operation is completed (step S128), and the photometering switch 53 is turned ON (i.e., the shutter button is slightly depressed) (step S129). After the taking operation has been completed, the 3-minute timer is reset to start the same (step S131). If the back cover 8 is closed at step S102 and the power source is turned ON after the loading operation is finished (steps S103 and S104), or the strobe charge demand flag is set at step S113 after the power source is turned ON at step S112, or the mode setting operation or the drive setting operation is effected at steps S123 and S124 or steps S125 and S126, the 3-minute timer is reset (step S131).

If a loading error is detected at step S127, or completion of the film rewinding is detected at step S128, or the photometering switch 53 is turned OFF at step S129, or the taking operation is finished and the 3-minute timer is reset to start at steps S130 and S131, whether the telephoto switch 55 and the wide angle switch 56 are turned ON is checked at steps S132 and S135.

If the telephoto switch 55 is turned ON at step S132, whether the powered zoom lens 3 is in the telephoto extremity is checked at step S133. If the powered zoom lens 3 is not in the telephoto extremity, the zoom lens is moved to the telephoto extremity (step S134). Similarly, if the wide angle switch 56 is ON, whether the powered zoom lens 3 is in the wide angle extremity is checked (steps S135 and S136). If the powered zoom lens 3 is not in the wide angle extremity, the zoom lens is moved to the wide angle extremity (step S137). When the powered zoom lens control, as mentioned above, is carried out, the 3-minute timer is reset (step S138).

Thereafter, whether the strobe charging is demanded is checked by the strobe charge demand flag at step S139. The strobe charge demand flag is set when the remote control unit 12 is detached from the camera body 1, the power source is turned ON, or the strobe light is emitted. If the strobe charge demand flag is set at step S139, control proceeds to step S141 to charge the strobe. During the strobe charge operation, in which a capacitor (not shown) is charged, if any switch which requires an operation is actuated, the charging is interrupted, and control is returned to step S101 of the main flow from step S142. If no operation is required at step S142, the charging continues until it is completed. When the strobe charge is finished, the strobe charge demand flag is cleared, and control proceeds to step S143.

At step S143, if any momentary switch is actuated, control is returned to step S132. I f no switch is actuated, whether the set time of the 3-minute timer is up is checked (step S144). I f the set time is up, the focal length, mode, state of drive data, etc. are stored in the memory (steps S144 and S145). Thereafter, the power source is automatically turned OFF, and the 30-minute timer is started (steps S146 and S147).

After that, whether the remote control unit 12 is detached from the camera body 1 is checked (step S148). If the remote control unit 12 is detached from the camera body 1, control proceeds to step S149. Conversely, if the remote control unit 12 is attached to the camera body 1, control proceeds to step S150, in which an operation can be effected only when the back cover switch 52 is turned ON, the main switch 51 is closed, or the set time of the 30-minute timer is up.

If the set time of the 3-minute timer is not up at step S144, whether there is a loading error and whether a film rewinding operation is finished (steps S151 and S152) are checked. If there is a loading error or the film rewinding operation is finished, the power supply to the light receiving circuit is stopped (steps S151~S154). Thereafter, control proceeds to step S155 in which an operation can be effected only when the back cover switch 52 or the remote control switch 59 is turned ON, the momentary switch is closed, or the set time of the 3-minute timer is up.

If there is no loading error and if the film rewinding operation is not finished, control proceeds to step S153 to check whether the remote control unit 12 is detached from the camera body 1 (steps S151~S153). If the remote control unit 12 is detached from the camera body 12, whether the power source of the light receiving circuit 47 is turned ON is checked (step S156). If the remote control unit 12 is attached to the camera body 12, the power supply to the light receiving circuit 47 is stopped (step S154). Control then proceeds to step S155. If the power source of the light receiving circuit 47 is turned ON at step S156, the remote control operation is carried out at step S161. Thereafter, the self lamp 7 which indicates that the remote control operation can be carried out blinks at 1 second intervals, and the camera stands-by for receipt of the remote control signal.

If the power source of the light receiving circuit 47 is turned OFF when the remote control unit 12 is detached from the camera body 1, the power source of the light receiving circuit 47 is turned ON. The drive memory is then set to "0" (steps S157 and S158). Namely, the normal mode in which a picture is taken for each frame is compulsively set. Thereafter, the 3-minute timer is reset, the charge demand flag is set, and control is returned to step S141 (steps S159, S160 and S141).

If the remote control release signal is received at step S162, control proceeds to step S130 (picture taking operation). If the remote control release signal is not received at step S162, and if the remote control zoom signal is received at step S163, the zoom lens barrel 2b is toggle-moved toward the telephoto extremity or wide angle extremity every time the remote control zoom signal is received (steps S164~S166). If no zoom signal is received, control proceeds to step S167, in which an operation can be effected only when the back cover switch 52 or the remote control switch 59 is switched, the set time of the 1-second or 3-minute timer is up, or the remote control signal is input. In the illustrated embodiment, although only the wide angle extremity or the telephoto extremity is realized in accordance with the remote control signal, it is possible to provide three, or more than three zoom stages (zoom positions).

Figure 10:
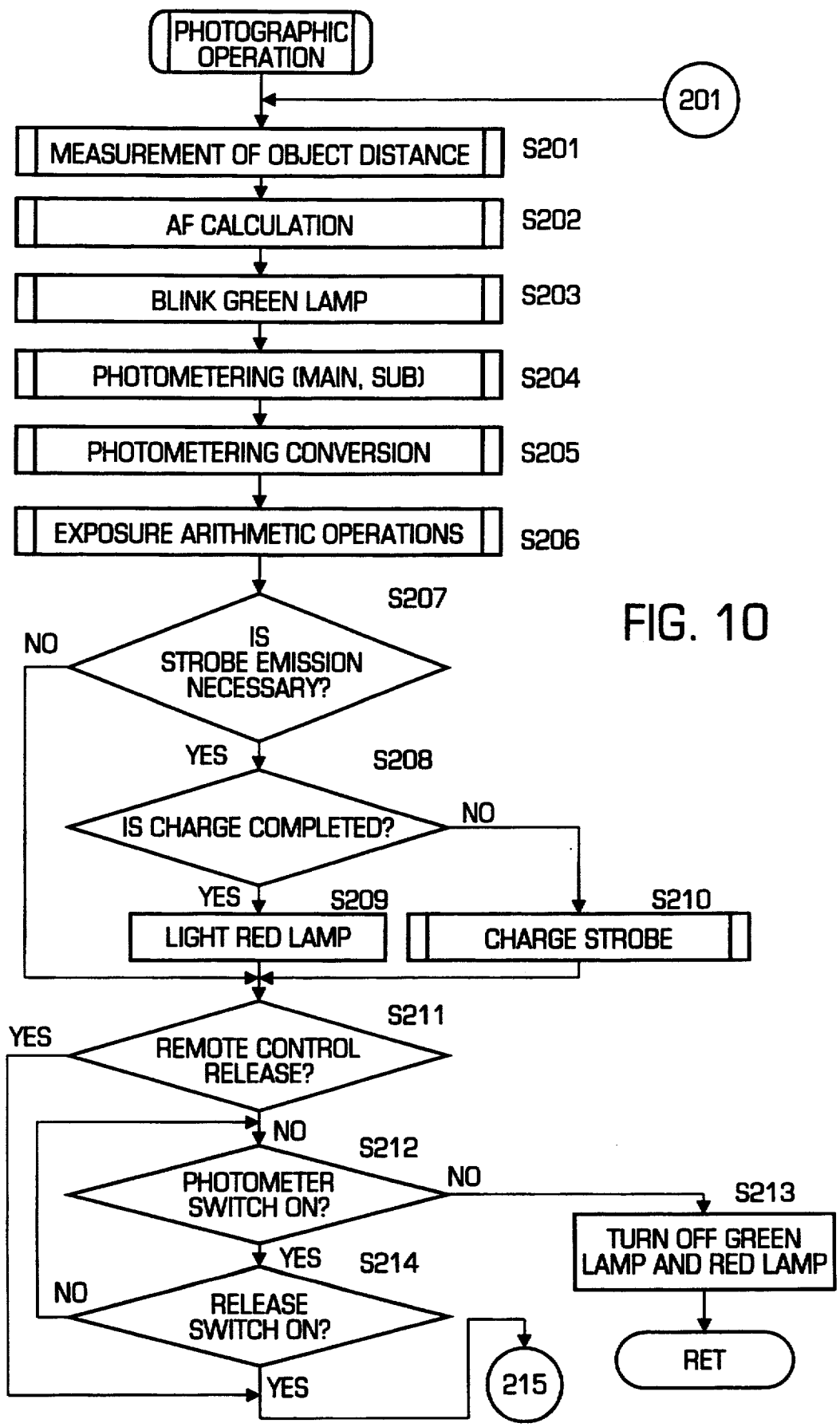
FIGS. 10, 11 and 12 are flow charts of a taking operation (photographing operation) of a remote control camera according to the present invention; and, FIG. 13 is a flow chart of a battery judging operation of a remote control camera according to the present invention.
Figure 11:
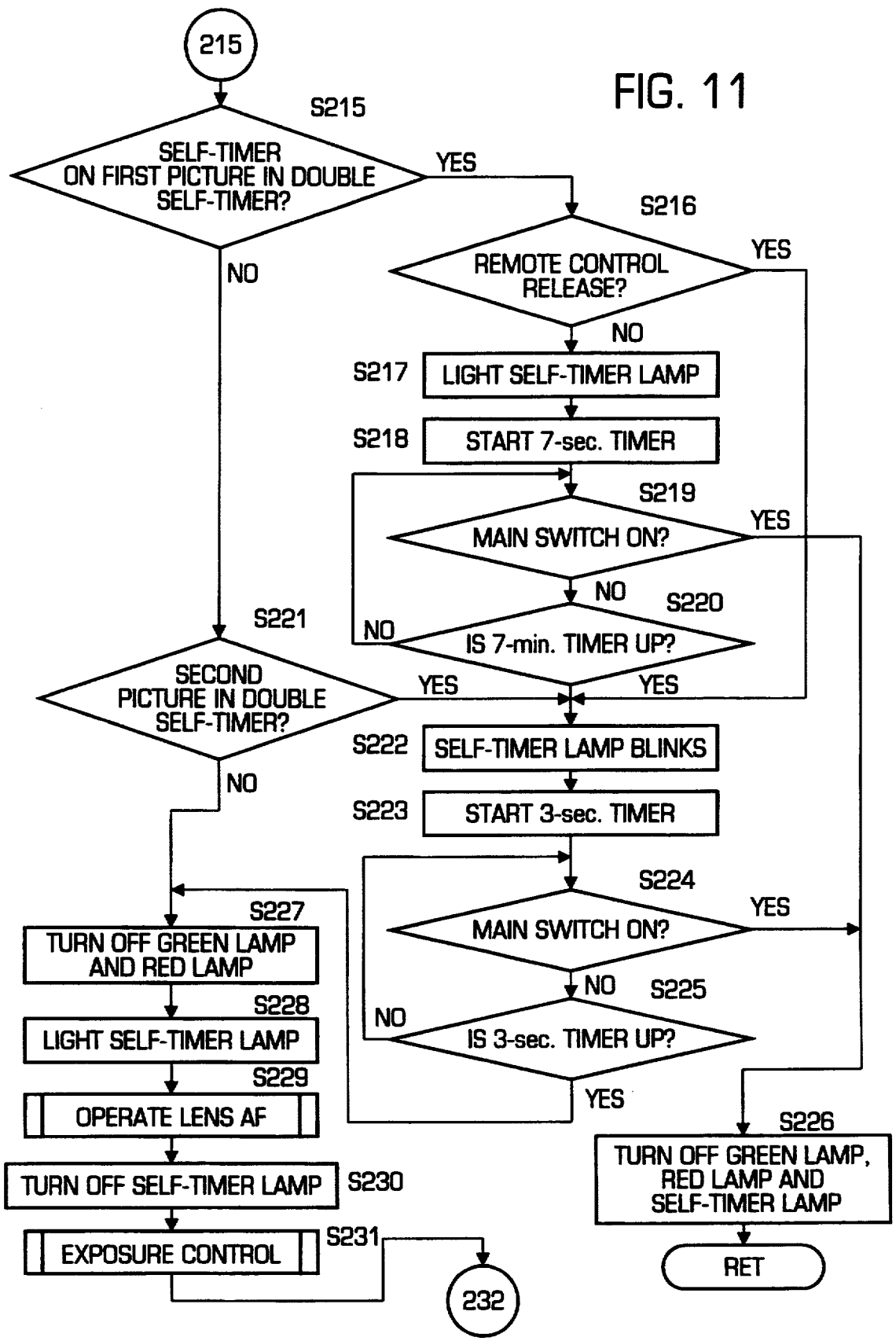
Figure 12:
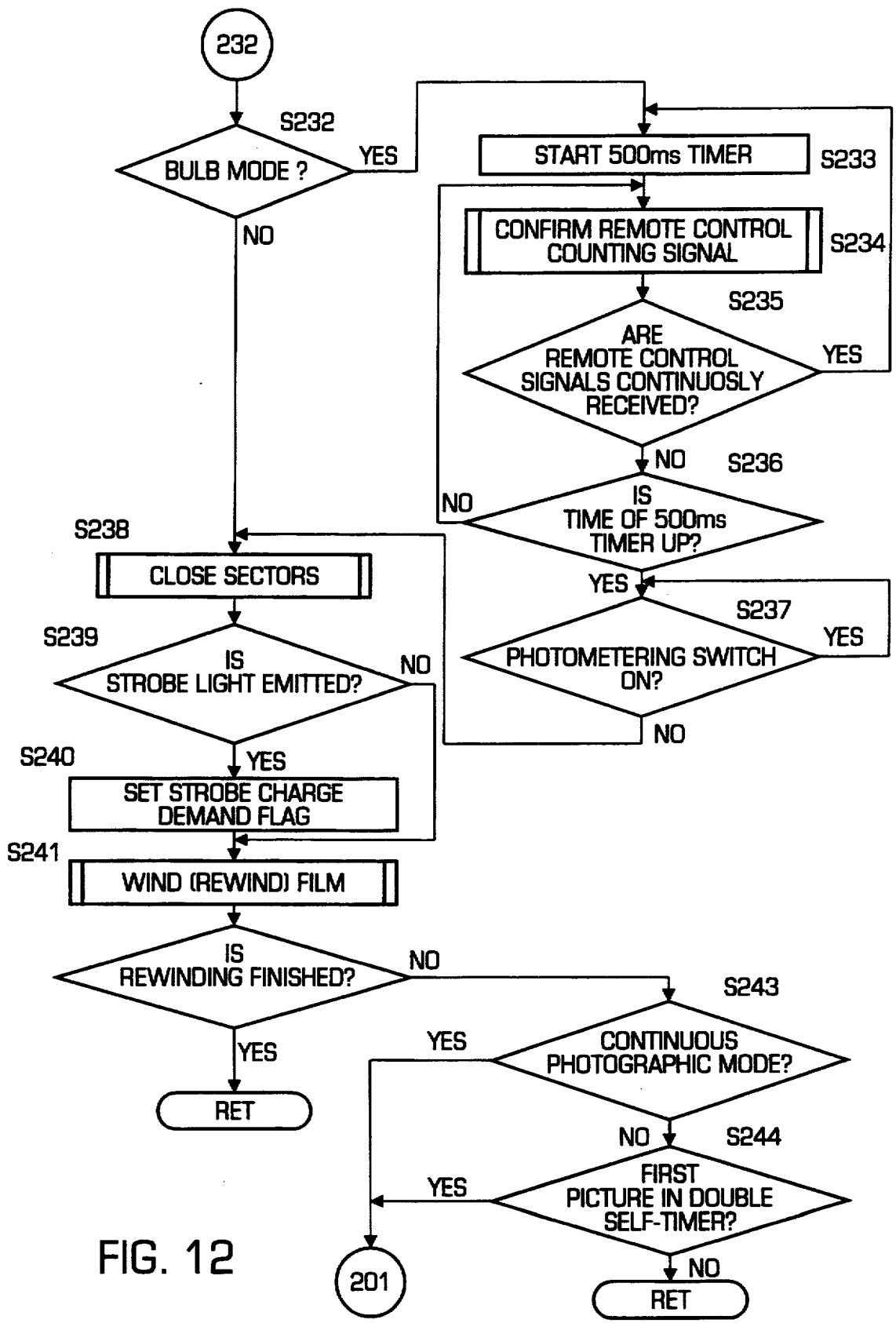

FIGS. 10 through 12 show the picture taking operation (photographic operation) at step S130.

In the picture taking operation, in AF (Automatic Focusing) arithmetic operation, measurement of object distance, operation of the green lamp, measurement of object brightness, photometering conversion, and exposure arithmetic operations are performed (steps S201~S206). Thereafter, control proceeds to step S207 to check whether the strobe emission is necessary. If the strobe light is not necessary, control proceeds to step S211. Conversely, if the strobe light is necessary, whether the strobe charging is completed is checked at step S208. If the strobe is charged, the red lamp 23 is illuminated. If the strobe is not sufficiently charged, the strobe charging operation is continued (steps S208~S210). During the charging operation, the red lamp 23 blinks. Upon completion of the charging operation, the red lamp 23 is illuminated. In the case where the remote control is not released, when the photometering switch 53 is turned OFF, the charging operation is interrupted.

If the remote control release signal is received at step S211 to enter a sub-routine shown in FIGS. 11 and 12, control proceeds to step S215. If control enters the sub-routine by the operation of the photometering switch 53, the release switch 54 is turned ON while the photometering switch 53 is ON to send control to step S215 (steps S212 and S214). If the photometering switch 53 is turned OFF, the red lamp 23 and the green lamp 22 are turned OFF, and control is returned to the main flow (steps S212 and S213).

At step S215, whether the self-timer function or the double self-timer function is selected is checked. If the self-timer function or the double self-timer function is selected, the self-timer operation at steps S216~S226 is carried out. Namely, if the normal self-timer function is selected, or a picture of a first frame in the double self-timer function is to be taken, whether the mode is the remote control release mode is checked (step S216). In the case of the remote control release operation, the self-timer lamp 7 blinks, and the 3-second timer is started (steps S222, S223). When the set time of the 3-second timer has elapsed, the red lamp 23 and the green lamp 22 are turned OFF (steps S225, S227). Thereafter, the self-timer lamp 7 is illuminated at step S228. The automatic focusing operation of the lens is then carried out (step S229). Thereafter, the self-timer lamp 7 is turned OFF, and the exposure control is effected (steps S230, S231).

If the operation is not the remote control release operation, the self-timer lamp 7 is lit, and the 7-second timer is started (steps S216, S217 and S218). If the main switch 51 is not actuated before the set time of the 7-second timer is up at step S219, control proceeds to step S222 to blink the self-timer lamp 7. Thereafter, the 3-second timer starts (step S223). If main switch 51 is not actuated before the set time of the 3-second timer is up, control proceeds to step S227 to perform the operations at steps S227 through S231.

If the main switch 51 is turned ON before the set times of the 3-second timer and the 7-second timer are up, control proceeds to step S226 to cancel the self-timer function (steps S219, S226 or S224 and S226).

If the normal self-timer function is not selected or if no picture of a first frame in the double self-timer function is taken, whether a picture of a second frame in the double self-timer function is to be taken is checked at step S221. If the second picture is to be taken, the operations at steps S222 through S226 are performed to take the second picture with a delay time of 3 seconds (steps S215, S221 and S222).

If the picture is not the second one in the double timer function, the operations at steps S227 through S231 are directly performed (steps S221, S227~S231).

As can be understood from the above discussion, if a picture is taken with the normal self-timer function or a first picture is taken with the double self-timer function from the camera body side, the photographic operation is carried out when both the 3-second timer and the 7-second timer are set, so that a total delay time of 10 seconds is set. On the other hand, in the case of the remote control release, operation when the exposure mode is set to be a self-timer mode, or in the case where a second picture in the double self-timer function is to be taken, a delay time of 3 seconds is set.

In the first 7 seconds of the above-mentioned delay time of 10 seconds, the self-timer lamp 7 is continuously lit, but, in the remaining 3 seconds, or the delay time for the second picture in the double self-timer function, the self-timer lamp 7 blinks. Furthermore, if the main switch 51 is actuated during the self-timer function, the self-timer operation is interrupted, and the green lamp 22, the red lamp 23, and the self-timer lamp 7 are all turned OFF, so that control is returned to the main flow (steps S224, S226).

If the self timer function is not selected or when the self timer function is appropriately completed, the green lamp 22 and the red lamp 23 are turned OFF, and the self-timer lamp 7 is maintained ON, and the automatic focusing operation of the lens is carried out (steps S215, S221, S227~S229). After that, the self-timer lamp 7 is turned OFF. Thereafter, the exposure control operation is carried out (steps S230, S231). In the exposure control operation, the shutter blades (sectors) are opened to a diaphragm value that is calculated at step S206, and no operation is effected for the exposure time calculated. When the exposure time lapses, control proceeds to step S232.

After the exposure control is effected at step S231, whether the bulb mode is selected is checked (step S232). If the bulb mode is not selected, the shutter blades (sectors) are closed to finish the photographic operation (step S238). Thereafter, whether strobe light is emitted is checked (step S239). If strobe light is emitted, the strobe charge demand flag is set. Thereafter, the film is wound by one frame (steps S240, S241). If no strobe light is emitted, the film is wound by one frame without setting the strobe charge demand flag. When the end of the film is detected, the automatic film rewinding operation is effected (S241).

If the completion of the film rewinding operation is detected at step S242, control is returned to the main flow. If the film rewinding operation is not completed at step S242, control proceeds to step S243 to detect the continuous photographing mode. If the photographing mode is a continuous shot mode, control is returned to step S201. If the photographing mode is not the continuous shot mode, control proceeds to step S244 to check whether the first picture in the double self-timer function is to be taken. If the first picture in the double self-timer function is to be taken, control is returned to step S201. If the picture to be taken is not the first picture, control returns to the main flow.

If the bulb mode is selected at step S232, control proceeds to step S233 to start a 500 msec timer and confirm that the remote control signals issued at an interval within 50 msec from the remote control unit 12 are being continuously received (steps S234 and S235). As long as the remote control signals are continuously received, the shutter blades (sectors) remain in an open position. The shutter blades are also maintained in the open position while the shutter release button (photometering switch 53) is depressed. If the set time of the 500 msec timer is up and if the photometering switch 53 is turned OFF, the shutter blades are closed (steps S236, S237 and S238).

Alternatively, in the bulb mode, it is possible to open and close the shutter blades, for example, in response to the first remote control release signal and the second remote control release signal, respectively.

Figure 7A:
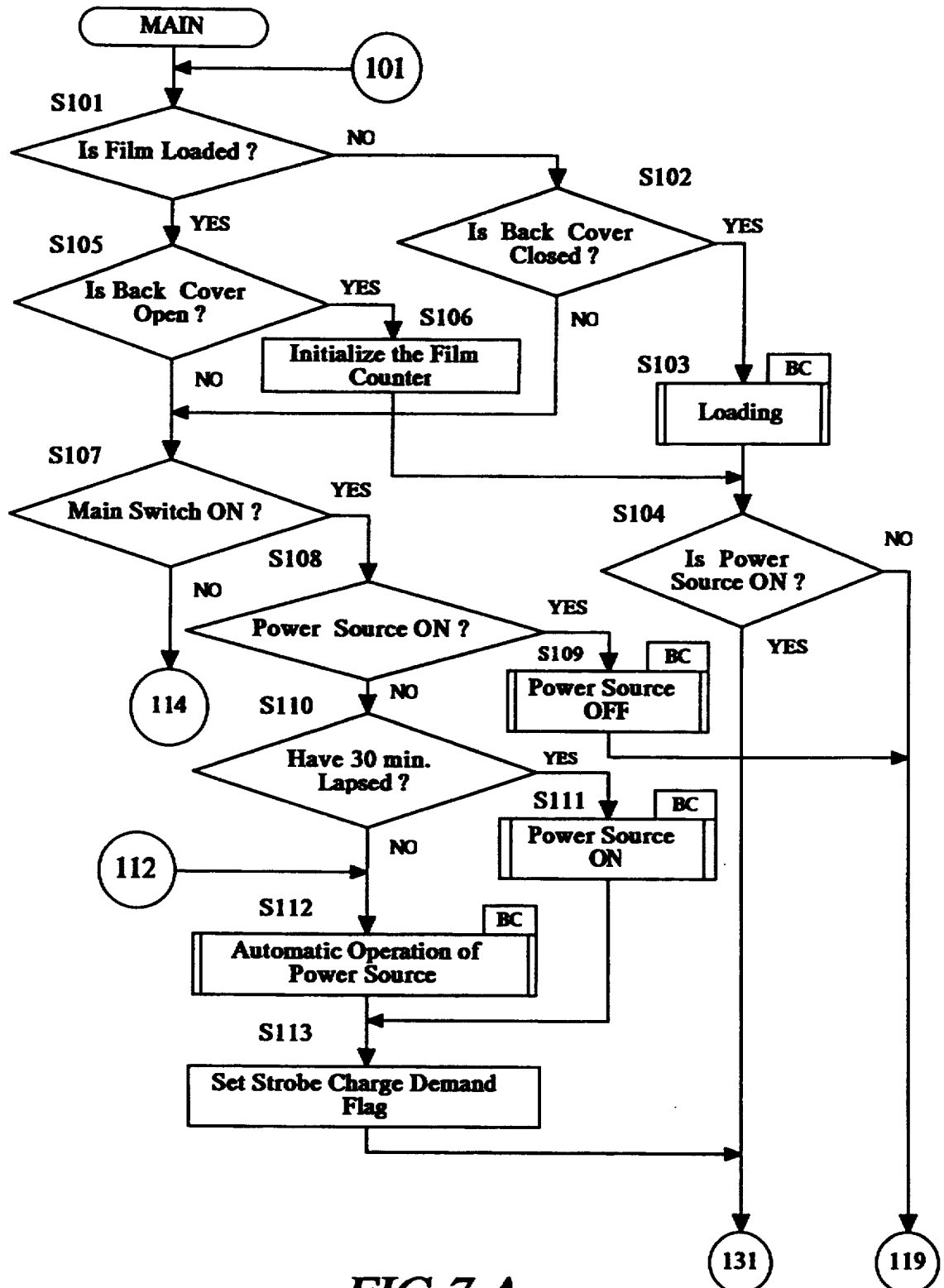
FIGS. 7A, 7B, 8A, 8B, 9A and 9B are flow charts of a main operation of a remote control camera according to the present invention.
Figure 7B:
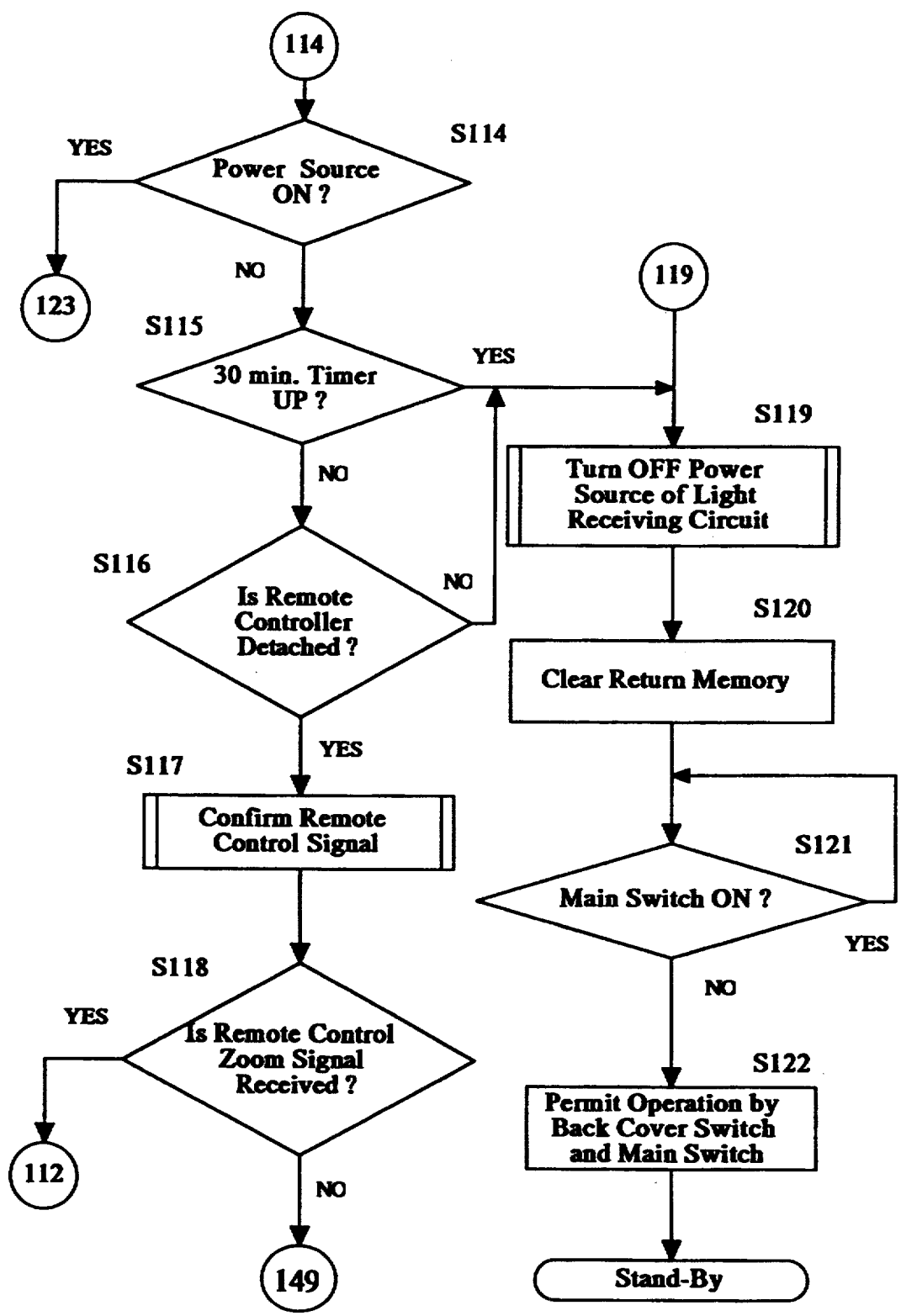
Figure 8:
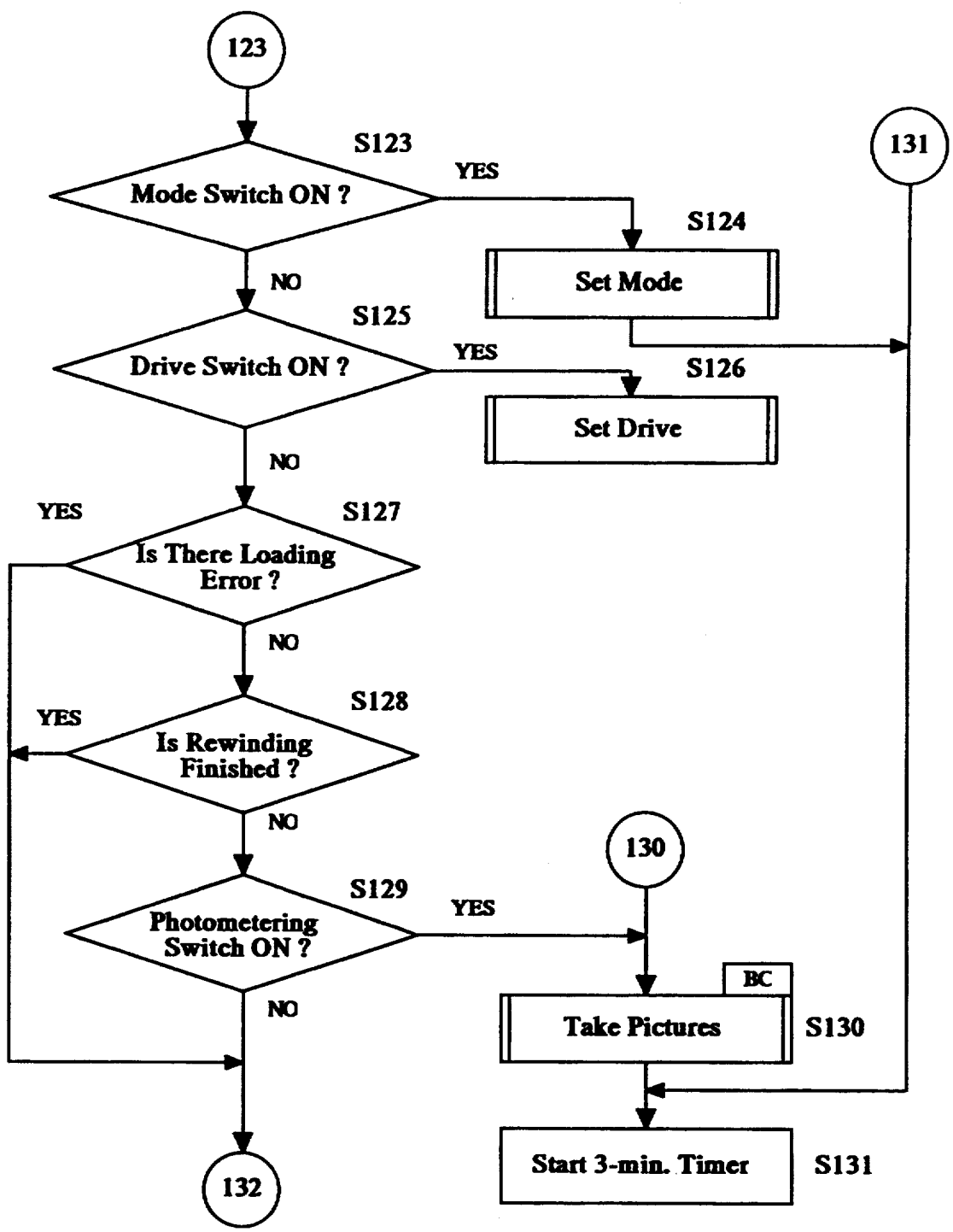
Figure 8:
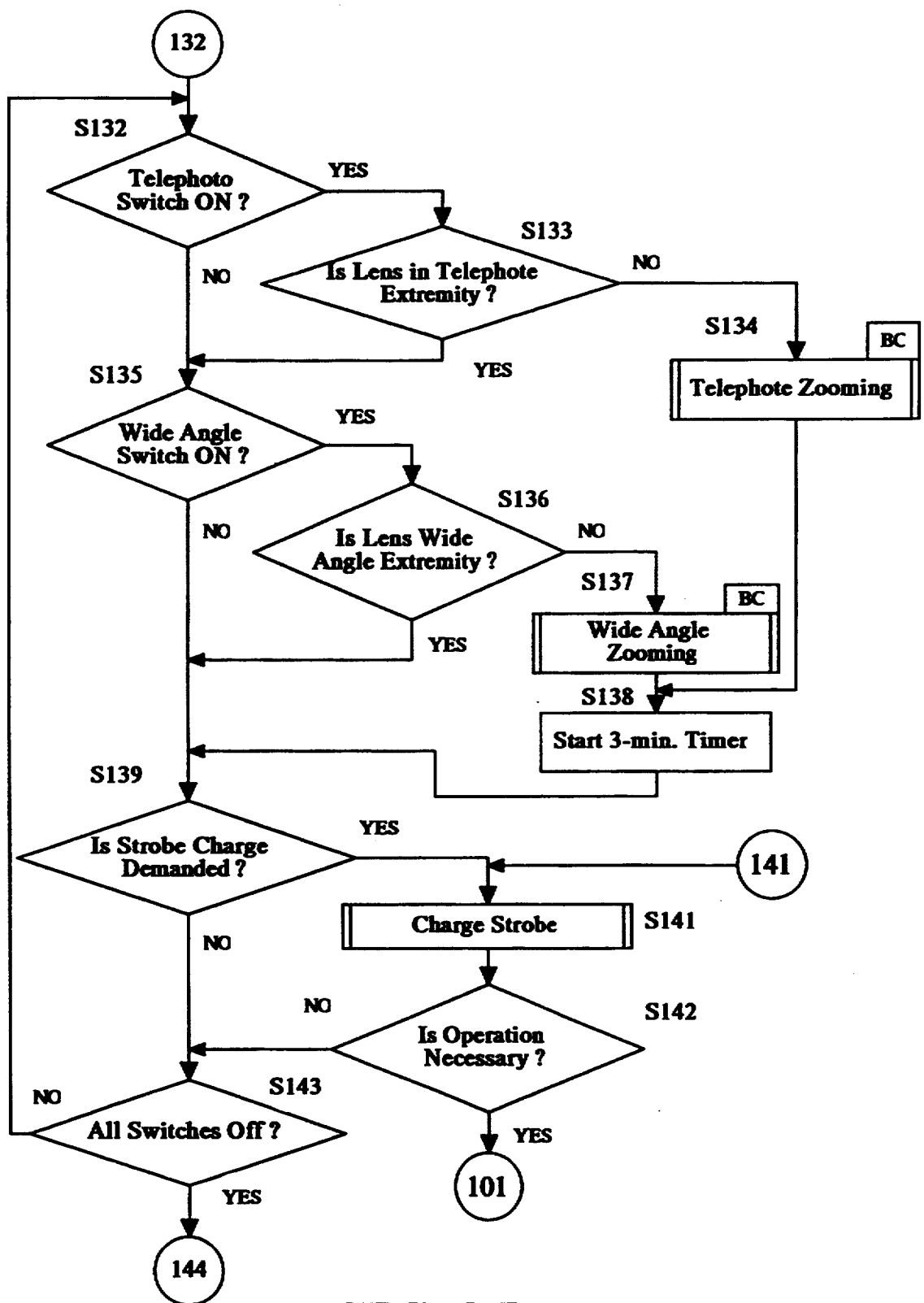
Figure 9:
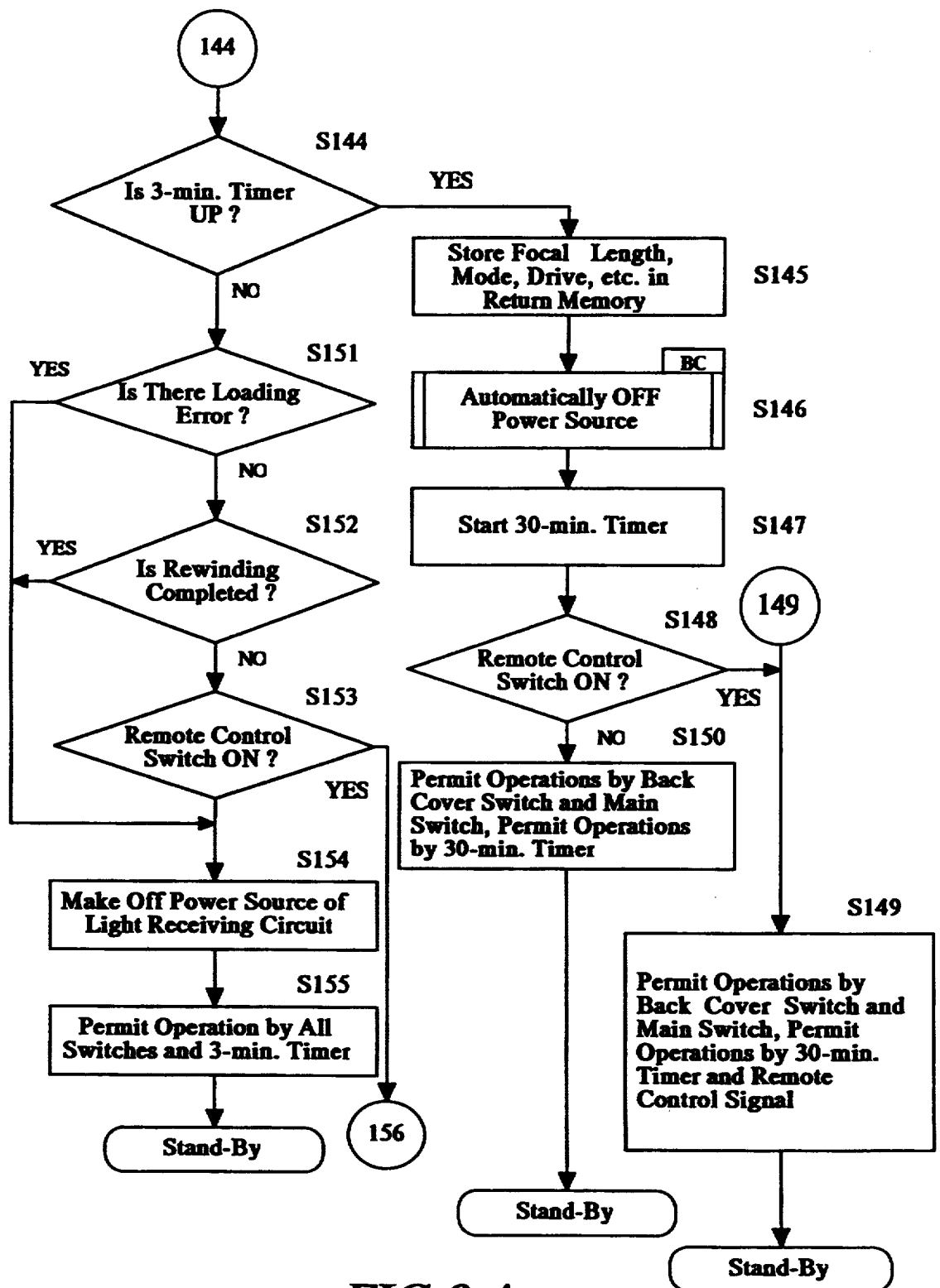
Figure 9B:
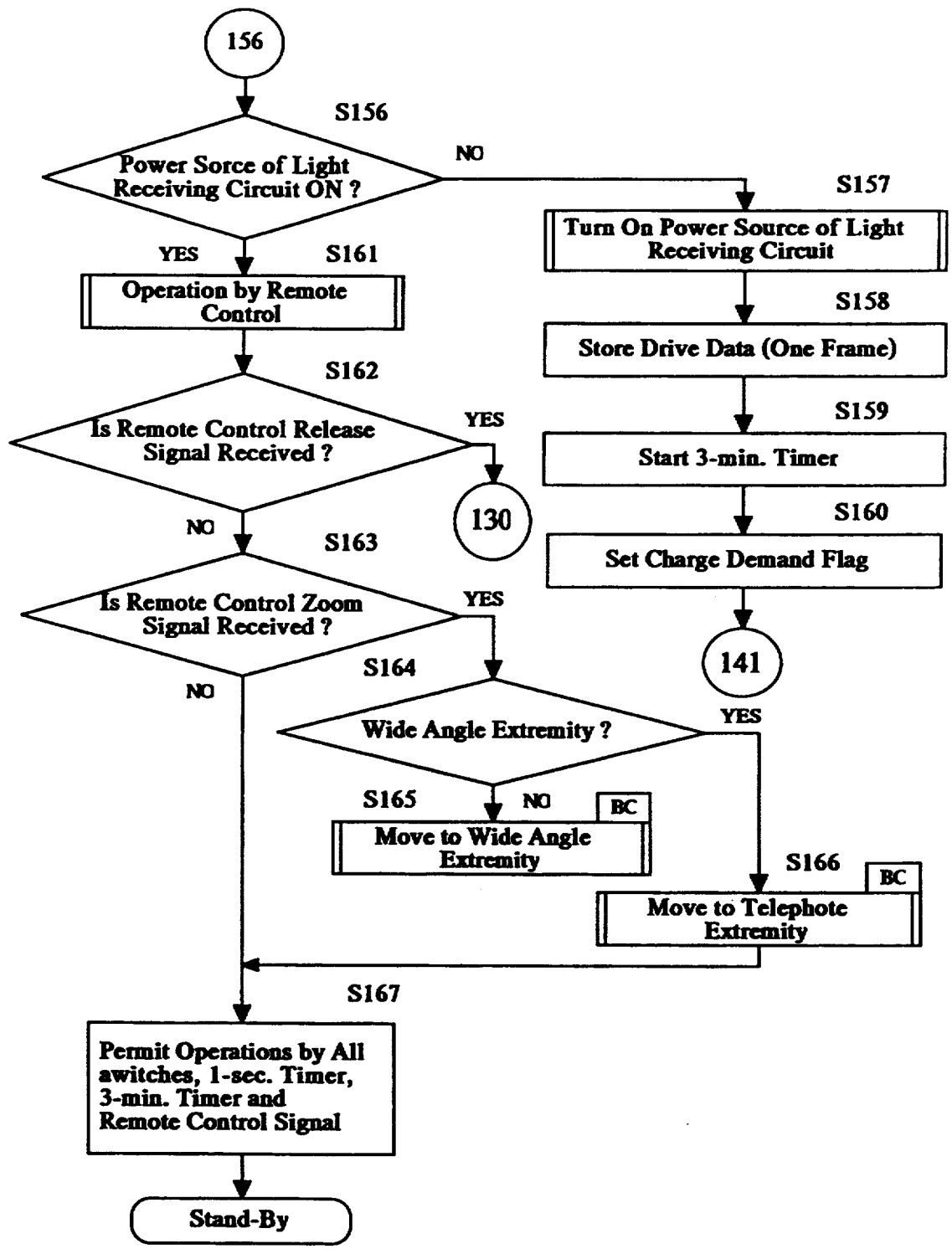

In a camera of the present invention, upon operating the motor or the like with a high power (e.g. electric current), for example, in steps S103, S109, S111, S112, S130, S134, S137, S146, S165, and S166, etc., the charge state of the battery is determined as shown by blocks labelled "BC" in FIGS. 7 through 9 before the respective operations are performed.

Figure 13:
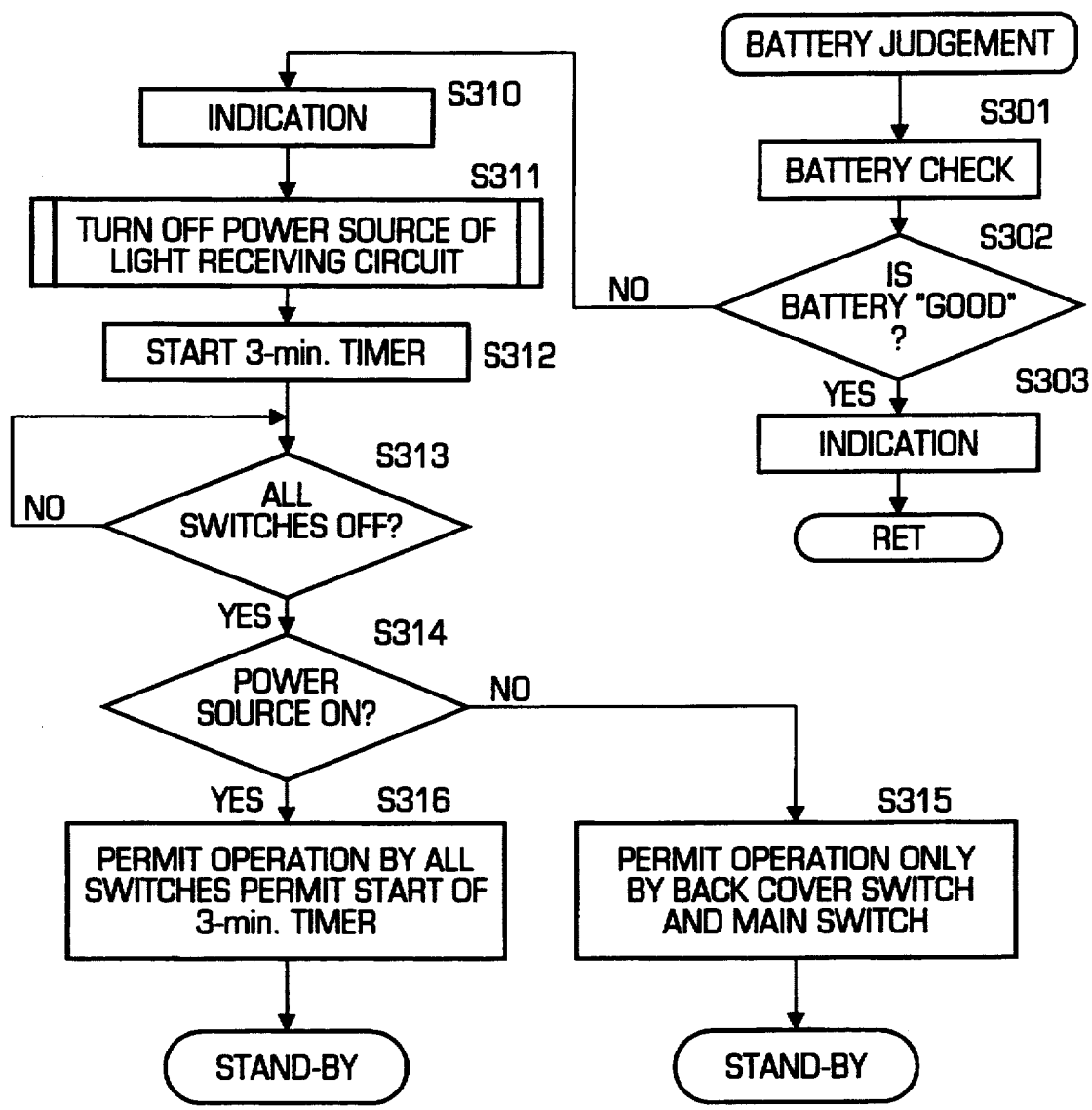

FIG. 13 shows an example of a judgement of the charge state of the battery. In the judgement, the voltage drop which is caused, for example, when a large quantity of electric current is supplied to the motor, is detected at step S301. If the voltage drop is larger than a predetermined value, the battery is "good" (normal), and if the voltage drop is smaller than a predetermined value, the battery is "not good" (abnormal), respectively (step S302).

If it is determined that the battery is "good", the portion 37 of the LCD window 11 which indicates the discharge state of the battery is illuminated, and the camera can normally operate (steps S301~S303). Conversely, if the battery is determined to be "not good", the portion 37 of the LCD window 11 blinks (step S310), and the power supply to the light receiving circuit, which is mounted to the camera body to receive the signals sent from the remote control unit 12, is cut (step S311). Thus, the power consumption of the camera body can be reduced.

Thereafter, the 3-minute timer starts at step S312. Whether one of the switches other than the remote control switch and the back cover switch is actuated is then checked (step S313). If one of the switches other than the remote control switch 18 and the back cover switch 52 is depressed, no operation is effected until that switch is released. If no switch is actuated, whether the power source is turned ON is checked at step S314. If the power source is OFF, control proceeds to step S315, in which the operation can be effected only when the back cover switch or the main switch 51 is actuated.

If the power source is ON at step S314, the camera is responsive to all the switches and can operate when the set time of the 3-minute timer is up (step S316).

Consequently, if the battery is determined not to be good in the battery judgement operation mentioned above, the intended operation cannot be carried out, and the camera stand-by state is effected at steps S315 or S316. If the power source is turned ON and any switch is again actuated, the corresponding (intended) operation can be carried out as long as the battery is "good".

If the set time of the 3-minute timer (step S312) is up, control is returned to the start of the main flow, and if any switch is actuated, the corresponding operation is effected, so that the judgement at step S143 is "YES", even if no switch is actuated. Consequently, the power source is automatically turned OFF (step S146), so that the movable zoom lens barrel 2b is retracted into the stationary zoom lens barrel 2a.

In the illustrated embodiment, if no operation of the camera is effected for 3 minutes, the commencement of the 3-minute timer is detected at step S144, so that the focal length and data on the mode and drive are stored in the memory (step S145) and the power source is automatically turned OFF (step S146), regardless of the detachment or attachment of the remote control unit 12 to or from the camera. When the power source is automatically turned OFF, the movable zoom lens barrel 2b is retracted into the stationary zoom lens barrel 2a to protect the movable zoom lens barrel 2b, and power is not supplied to the strobe circuit 41, the film feed control circuit 42, the zoom lens control circuit 43, the shutter control circuit 44, the photometering circuit 45, the object distance measuring circuit 46, the remote control light receiving circuit 47, the LCD indicator 48, the lamp circuit 49, and the DX contact circuit 50, etc., to reduce the power consumption of the camera body 1, as long as the starting requirements specified in step S149 or S150 are satisfied. At the same time, the 30-minute timer starts (step S147). The 3-minute timer is reset when any operation of the camera body is performed, for example, when the photographic operation is completed, the zoom lens is moved or the power source of the light receiving circuit is turned ON, etc., (step S131, S138 or S159).

After the set time of the 3-minute timer is up, when the remote control switch is maintained OFF, i.e., the remote control unit 12 is attached to the camera body, the camera is in a stand-by position in which all the power sources, including that of the return memory, are turned OFF when the set time of the 30-minute timer is up, or the intended operations which are driven by the back cover switch or the main switch can be effected (step S148).

If the remote control unit 12 is detached from the camera body, the associated operations can be effected by the back cover switch or the main switch and all the power sources including that of the return memory are turned OFF when the set time of the 30-minute timer is up, similar to the foregoing. In addition thereto, if the remote control unit 12 is detached from the camera body, the associated operations can also be effected in accordance with the signals sent from the remote control switch (step S149). Consequently, when the back cover switch or the main switch is actuated, or when the remote control signals are received, the data stored in the return memory is immediately transferred to the necessary memory to revive the camera function.

Consequently, in the case where a picture is taken by a photographer after the remote control unit is detached from the camera body, it is not necessary for the photographer to return, after a short period of time, to the camera body to turn the main switch ON again, thus resulting in a realization of an improved useful and easily operable remote control camera.

In the illustrated embodiments, in the course of normal operation, the strobe is charged when the power source is turned ON or when the strobe light is emitted. If the strobe is, however, charged only when these requirements are satisfied, the strobe may not be ready for emitting strobe light when the releasing operation is effected by the remote control, thus missing a shutter chance. To avoid this, the strobe is charged even when the remote control unit is detached from the camera body, so that the strobe light can always be emitted at a time in which the remote control operation can be carried out.

As can be seen from the above discussion, according to the present invention, when a camera does not operate for a first predetermined period of time (e.g., 3 minutes), power is not supplied to elements other than the signal receiving circuit for receiving the remote control signals sent from the remote control unit, thereby enhancing the convenience of the remote control and reducing the power consumption.

Furthermore, after the lapse of a second predetermined period of time (e.g., 30 minutes), all the power sources are automatically turned OFF to save power, since it is considered, at this point, that a user has failed to turn OFF the power source.

Since a photographer who uses the remote control unit can release the self-timer at the position of the object to be taken without returning to the camera body, no delay time of the self-timer is necessary, resulting in an improved convenient remote control camera having a high commercial value.

Furthermore, according to the present invention, since the bulb function can be remotely controlled by the remote control unit, a higher bulb controllability can be obtained than in the prior art.

In the illustrated embodiments, whether the strobe charge is necessary is determined in accordance with the strobe charge demand flag at step S139. The strobe is charged at step S141 if necessary. When the remote control unit is, however, detached from the camera body, the camera is in the stand-by position, as mentioned above. During the stand-by position, which can last for 30 minutes, the object brightness or other parameters which determine the emission of the strobe light may vary, or an excess self-discharge of the condenser may occur. Taking this into account, according to the present invention, when the remote control switch is turned ON, i.e., the remote control unit is detached from the camera body (step S153), and the power source of the light receiving circuit has been in an OFF state (step S156), if the power source of the light receiving circuit is turned ON in accordance with the remote control signal (step S157), the strobe charge demand flag is set, so that the strobe can be charged in accordance with need (step S160).

Consequently, according to the present invention, the strobe can emit strobe light at any time in accordance with need, thus leading to an increased reliability of the camera.

We claim:

1. A remote control camera having a camera body with separate motor driven elements and a remote controller which is detachably mounted to said camera body to emit a remote control signal to control at least one of a plurality of operations of said camera in a remote control mode, said camera body being provided with means for receiving said remote control signal emitted by said remote controller, and a strobe charging circuit, comprising:

a strobe;

means for detecting whether said remote controller is attached to said camera body; and a charge control circuit for actuating said strobe charging circuit to charge said strobe when said detecting means detects that said remote controller is not attached to said camera body.

2. A remote control camera according to claim 1, further comprising means for determining whether said charging of said strobe is necessary in accordance with predetermined requirements to actuate said strobe charging circuit when said charging of said strobe is determined to be necessary and said detecting means detects that said remote controller is not attached.

3. The remote control camera having a camera body and a remote controller according to claim 1, further comprising a first self-timer mode and a second self-timer mode, each of said self-timer modes including means for delaying a beginning of a releasing operation so as to commence an exposure operation after the expiration of respective first and second predetermined periods of time, said first predetermined period of time for said first self-timer mode being greater than said second predetermined period of time for said second self-timer mode, said second self-timer mode comprising control means for actuating said releasing operation delaying means in association with said remote control signal receiving means receiving said remote control signal emitted from said remote controller.

* * * * *

UNITED STATES PATENT AND TRADEMARK OFFICE
CERTIFICATE OF CORRECTION

PATENT NO. : 5,430,518
DATED : July 4, 1995
INVENTOR(S) : Y. TABATA et al.

It is certified that error appears in the above-indentified patent and that said Letters Patent is hereby corrected as shown below:

On the cover, in section [56], "References Cited", "U.S. PATENT DOCUMENTS", change "Wakaayashi" to ---Wakabayashi---.

Signed and Sealed this

Fourteenth Day of May, 1996

*Attest:*

BRUCE LEHMAN

*Attesting Officer*   *Commissioner of Patents and Trademarks*